US00RE41876E

(19) United States
(12) Reissued Patent
Fang

(10) Patent Number: US RE41,876 E
(45) Date of Reissued Patent: Oct. 26, 2010

(54) LIGHT SOURCE MECHANISM FOR AN IMAGING APPARATUS

(76) Inventor: Po-Hua Fang, 8F-2, No. 290, Gongyuan Rd., Hsin-chu City 300 (TW)

(21) Appl. No.: 11/274,717

(22) Filed: Nov. 14, 2005

Related U.S. Patent Documents

Reissue of:
(64) Patent No.: 6,646,769
Issued: Nov. 11, 2003
Appl. No.: 09/598,296
Filed: Jun. 21, 2000

(51) Int. Cl.

| | |
|---|---|
| ***H04N 1/04*** | (2006.01) |
| ***H04N 1/46*** | (2006.01) |
| ***F21V 3/00*** | (2006.01) |
| ***F21V 11/00*** | (2006.01) |
| ***F21V 5/00*** | (2006.01) |

(52) U.S. Cl. ..... 358/509; 358/475; 358/484; 362/223; 362/355; 362/311; 362/351

(58) Field of Classification Search ..... 358/509, 358/475, 484; 362/223, 355, 311, 351
See application file for complete search history.

(56) References Cited

U.S. PATENT DOCUMENTS 4,120,024 A * 10/1978 Aizenberg et al. ..... 362/96
4,460,939 A * 7/1984 Murakami et al. ..... 362/609
4,984,144 A * 1/1991 Cobb et al. ..... 362/339
5,190,370 A * 3/1993 Miller et al. ..... 362/340
5,339,382 A * 8/1994 Whitehead ..... 385/146
5,363,470 A * 11/1994 Wortman ..... 385/147
5,481,637 A * 1/1996 Whitehead ..... 385/125
5,671,306 A * 9/1997 York et al. ..... 385/36
5,673,122 A * 9/1997 Omori ..... 358/471
5,826,963 A * 10/1998 Cassarly et al. ..... 362/551
5,969,343 A * 10/1999 Nakamura et al. ..... 250/227.31
5,980,063 A * 11/1999 Ford et al. ..... 362/186
6,046,826 A * 4/2000 Lu et al. ..... 358/475
6,229,137 B1 * 5/2001 Bohn ..... 250/234
6,337,946 B1 * 1/2002 McGaffigan ..... 385/146

* cited by examiner

*Primary Examiner*—Houshang Safaipour
(74) *Attorney, Agent, or Firm*—Stolowitz Ford Cowger LLP

(57) ABSTRACT

A light source mechanism for an imaging apparatus comprises at least a point light source and a light shield. The point light source located at one end of the light shield is used for providing illumination to the imaging apparatus during a scanning process. The light shield is a hollow pipe structure and further includes a long slot lying along an axial longitudinal direction thereof for allowing lights to leave the light shield. An inner surface of the light shield is made as a diffusion surface for evenly diffusing lights inside the light shield, by which a homogeneous line light source for the scanning process is formed at the long slot of the light shield.

22 Claims, 5 Drawing Sheets

LIGHT SOURCE MECHANISM FOR AN IMAGING APPARATUS

Matter enclosed in heavy brackets [ ] appears in the original patent but forms no part of this reissue specification; matter printed in italics indicates the additions made by reissue.

BACKGROUND OF THE INVENTION (1) Field of the Invention

The invention relates to a light source mechanism for an imaging apparatus, and more particularly to a combination which integrate a point light source with a light shield for producing a line light source with enhanced homogeneous illumination.

(2) Description of the Prior Art

An imaging apparatus or a scanner is one of popular computer peripherals. In an imaging apparatus, an internal light source is used to generate an image from a document rested upon a document plate. The image is then forwarded through a plurality of lenses and experiencing a proper travel path to reach a CCD for being transformed into digital signals. The digital signals are then sent to a computer for further image processing.

Referring now to FIG. 1A and FIG. 1B, a perspective and a side views of a conventional light source mechanism are shown, respectively. The light source mechanism 1 mainly comprises a fluorescent tube 12 and a light housing 14. The fluorescent tube 12 for providing illumination during an imaging process has a length substantially equal to the width of the document rested upon the document plate of the imaging apparatus. The light housing 14 provides a lengthy internal accommodation room 141 thereof for installing therein the fluorescent tube 12. The accommodation room 141 as shown includes a lengthy aperture 142 for allowing the light of the fluorescent tube 12 to pass therethrough. The inner surface of the light housing 14, formed as a reflection surface for collecting and reflecting the light to enhance the illumination of the light source mechanism 1, can be preferably embodied as an arc surface or a parabolic surface.

Nevertheless, the conventional light source mechanism 1 as discussed generally has several disadvantages as follows.

1. In the conventional light source mechanism, a fluorescent tube is usually used as the light source. Yet, it is well known that the fluorescent tube can only provide lights limited to a narrow wave length range, and generally within the range of visible lights. However, some imaging apparatus are designed to proceed the scanning by invisible lights. Under such an arrangement, it is obvious that the fluorescent tube cannot provide the required light source to perform the scanning.
2. The conventional fluorescent tube is generally a product of short-life term and is vulnerable to be broken as well as invaded by gas.
3. The illumination provided by the conventional fluorescent tube is sometimes unstable and consequently affects the scanning quality of the imaging apparatus.
4. The unit price of the conventional fluorescent tube is usually high, so that the cost of the imaging apparatus cannot be reduced to a competitive level.

To resolve the aforesaid disadvantages of the conventional imaging apparatus using the fluorescent tube as the light source, additional effort in the industry to develop an improved light source mechanism is definitely necessary for producing an imaging apparatus with low cost, long life term, quality performance and wide-ranged application.

SUMMARY OF THE INVENTION

Accordingly, it is a primary object of the present invention to provide a light source mechanism for an imaging mechanism, in which a point light source is applied to provide improved imaging quality and advantages of low cost, stable illumination, long life term and a wider application range.

The light source mechanism for an imaging apparatus in accordance with the present invention includes at least a point light source and a light shield. The light source of the present invention for the imaging apparatus to perform the document scanning, preferably includes two point light sources located respectively at both ends of the light shield. The light shield, having a shape of lengthy hollow pipe structure, provides an internal mounting element at each end thereof for installing thereinside the respective point light source. One feature of the present invention is that the light shield includes a long slot located along a longitudinal direction thereof for transforming the lights provided by the inside point light sources into a line light source for performing the illuminating of a document. In addition, the interior wall surface of the light shield is formed as a diffusion surface for evenly diffusing the lights emitted by the point light sources, and thus a homogeneous line light source can be provided through the long slot to perform the document illuminating.

According to the present invention, the diffusion surface inside the light shield can be formed by a plurality of ring protrusions. In theory of optics, the ring protrusion can provide even diffusion upon the incoming point light source, so that homogeneous line light source can be produced through the long slot, even though point light sources does be applied as the real light source inside the light shield. In the present invention, the lights emitted by the point light sources might travel a substantial period and experience several diffusion inside the light shield before leaving the light shield through the long slot, so that the light quality provided by the light source mechanism of the present invention can be better than that provided by the conventional light source; though two separate point light sources might be used inside the light shield of the present invention.

All these objects are achieved by the light source mechanism for an imaging apparatus machine described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a light source mechanism for an imaging apparatus. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1A:
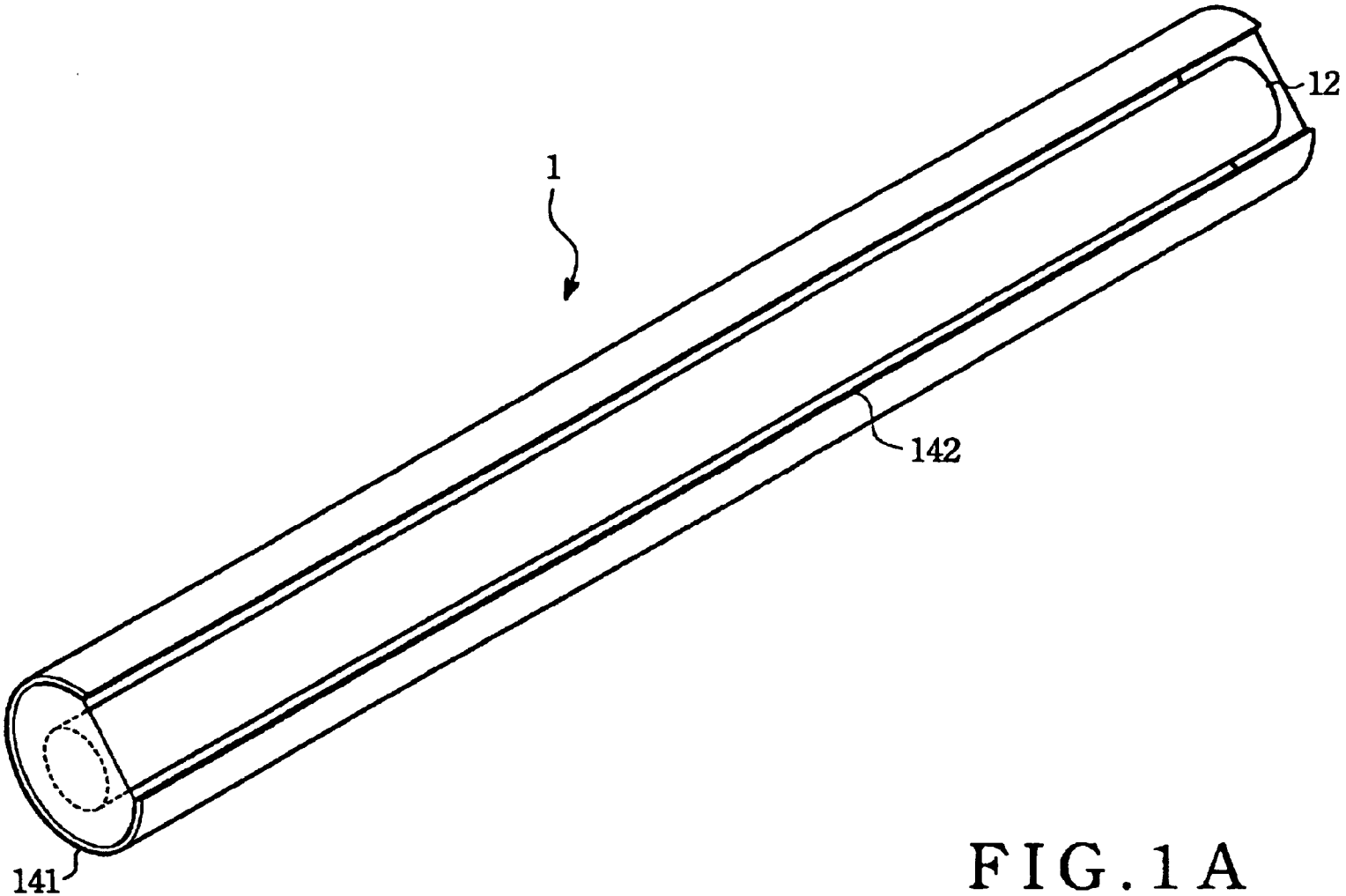
FIG. 1A (PRIOR ART)
FIG. 1A and FIG. 1B show respectively a perspective and a side view of a conventional light source mechanism for an imaging apparatus.
Figure 1B:
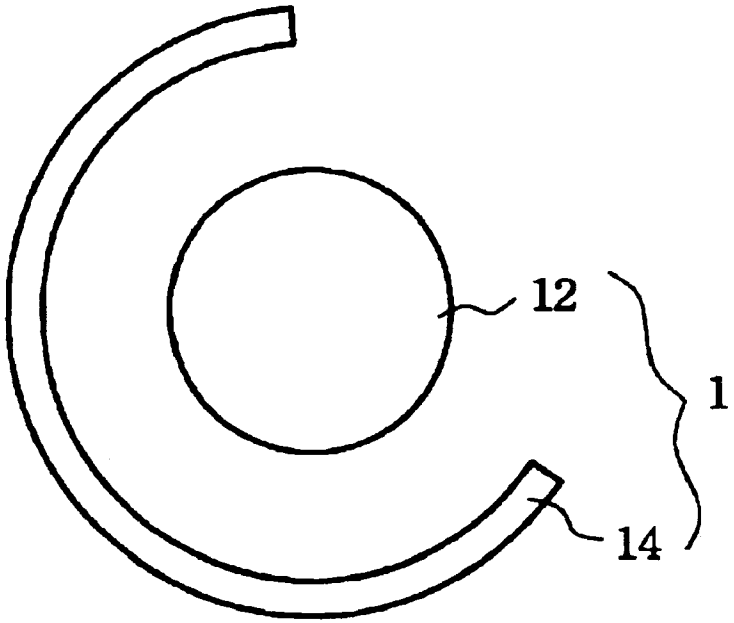
FIG. 1B (PRIOR ART)
Figure 2:
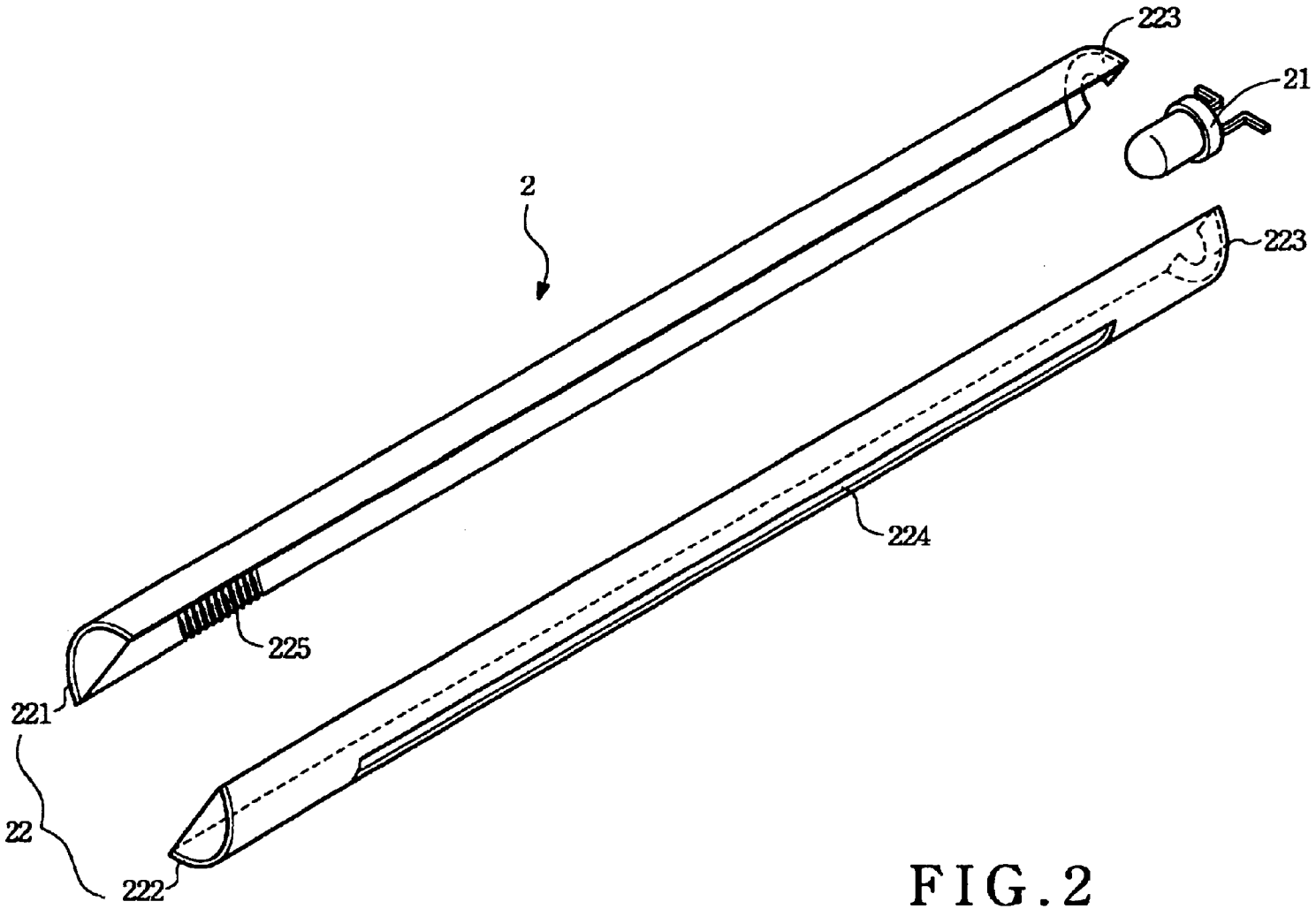
FIG. 2 is an exploded perspective view of a first embodiment of the light source mechanism for an imaging apparatus in accordance with the present invention.

Referring now to FIG. 2, a first embodiment of the light source mechanism for an imaging apparatus in accordance with the present invention is shown explodedly.

The light source mechanism 2 as shown includes a single point light source 21 and a light shield 22. The point light source 21 can be a light emitting diode (LED) which has advantages of low cost, longer life term, stable illumination and a wider wave range for application. To meet the requirement of the line light source for scanning the document, the light source mechanism 2 of the present invention utilizes the light shield 22 to transform the lights of the point light source 21 into an applicable line lights.

As shown in FIG. 2, the light shield 22 of the present invention, shaped as a long hollow pipe structure, includes an upper half 221 and a mating lower half 222. The light shield 22 can be preferably made of opaque materials. One end of the light shield 22 includes a mounting element 223 for installing the point light source 21. One feature of the present invention is that the lower half 222 of the light shield 22 further includes a long slot 224 lying along the axial longitudinal direction of the light shield 22. The long slot 224 has a length approximately equal to an ordinary width of a document for whole scale scanning. The interior surface of the light shield 22 can be formed as a diffusion surface 225 for evenly diffusing the lights emitted by the point light source 21 inside the light shield 22, in order to prevent from localized illumination phenomenon of a point light. Therefore, under such an arrangement of the present invention, quality line light source can be obtained from the long slot 224 which provides homogeneous line lights from the diffused lights inside the light shield 22, though the point light source 21 is applied.

Figure 3:
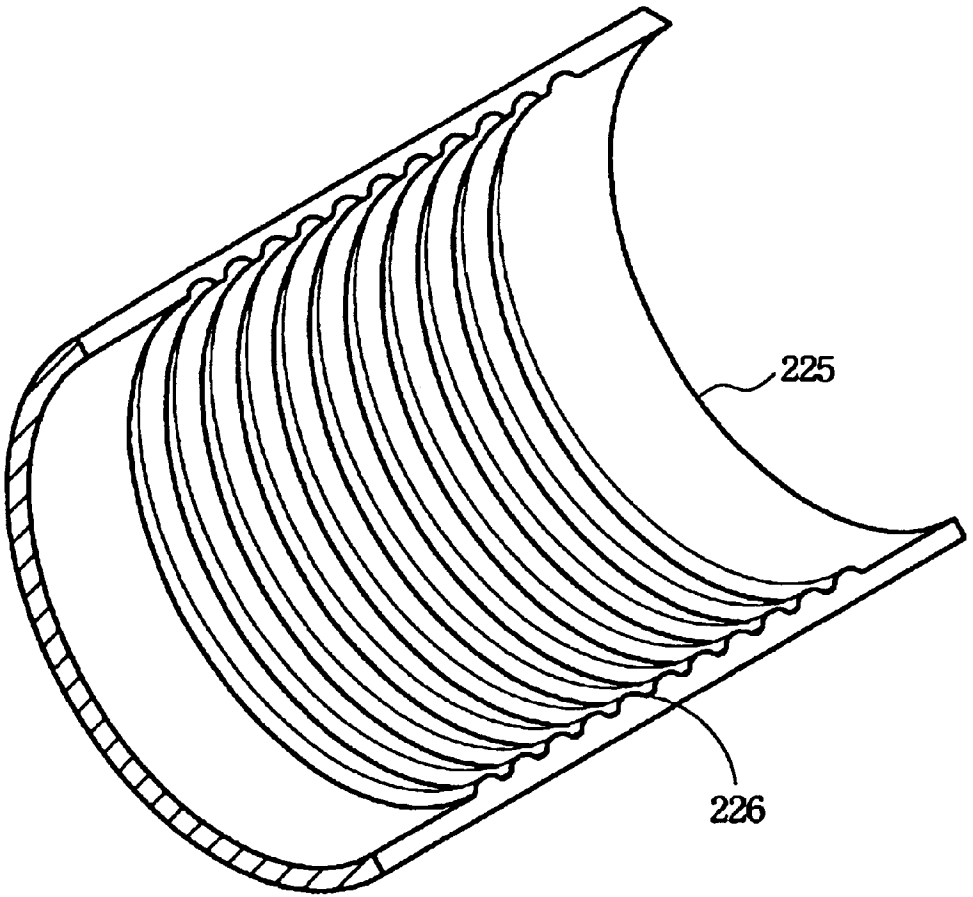
FIG. 3 is an enlarged perspective view of the ring protrusions for light diffusion inside the upper half of the light shield.

Referring now to FIG. 3, the diffusion surface 225 inside the light shield 22 can include a plurality of ring protrusions 226 located at the upper half 221 and a high reflection layer located at the lower half 222. Methods for forming the high reflection layer (not shown in the figure) can be any injection method or any electroplating. In the optics theory, the ring protrusions 226 can have an excellent diffusion ability. Therefore, the lights emitted by the point light source 21 can be evenly diffused inside the light shield 22, and then a homogeneous line light source can be constructed through the long slot 224.

Though the point light source 21 of the present invention is mounted at one end of the light shield 22, yet localized illumination of the light source mechanism adjacent to the point light source 21 can be avoided because lights through the long slot 224 might have experienced several diffusions inside the light shield 22.

Though the light source mechanism 2 of the present invention can utilize the light shield 22 to perform a homogeneous line light source through the long slot 224 for further illuminating upon the document, yet it is still believed that slight localized illumination phenomenon might exist at the area close to the point source 21 inside the light shield 22. Also, the phenomenon will become vague as the distance from the point light source 21 increases.

To resolve the aforesaid problem and to obtain a much improved quality line light source from the long slot 224, one of the solutions is to increase the diffusion ability of the ring protrusion 226 as its respective distance from the point light source 21 increases. Under such an arrangement, the illumination adjacent to the point light source 21 will be decreased a little bit due to the decrease in the diffusion ability of the ring protrusions 226 therearound. On the other hand, the illumination of the location distant from the point light source 21 will be increased slightly due to the increase in the diffusion ability of the ring protrusions 226 therearound. By proper adjustment upon the diffusion ability of the ring protrusions 226, the line light quality from the long slot 224 of the light shield 22 can be improved further, and so as the scanning quality.

Figure 4:
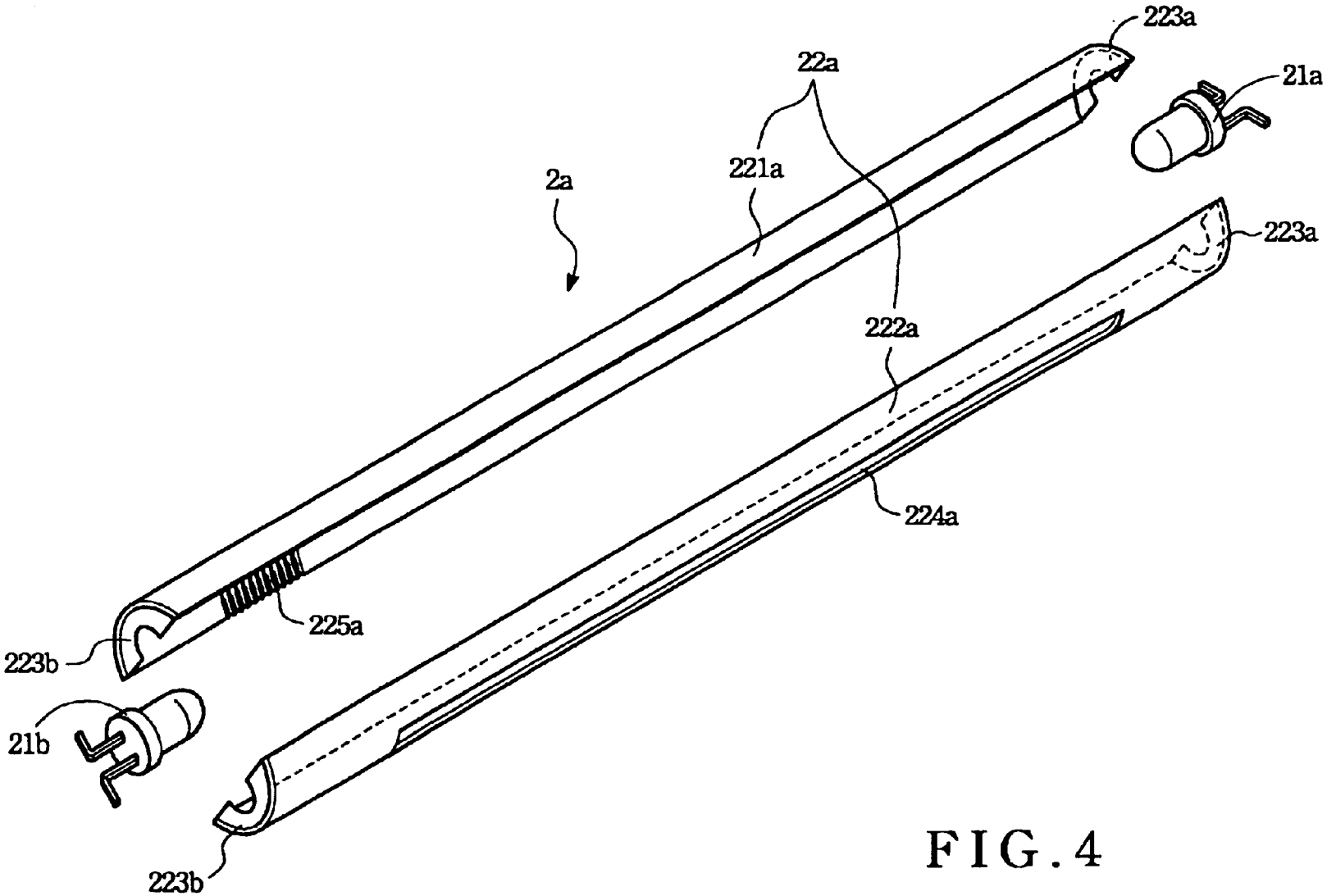
FIG. 4 is an exploded perspective view of a second embodiment of the light source mechanism for an imaging apparatus in accordance with the present invention.

Referring now to FIG. 4, a second embodiment of the light source mechanism for an imaging apparatus in accordance with the present invention is shown explodedly.

In the second embodiment, the light source mechanism 2a can include two point light source 21a and 21b, and a light shield 22a. The point light source 21a or 21b can be a light emitting diode (LED) which, as said in previous description, has advantages of low cost, longer life term, stable illumination and a wider wave range for application. These two point light sources 21a and 21b are preferably mounted to opposing ends of the light shield 22a.

As shown in FIG. 4, the light shield 22a of the present invention, shaped as a long hollow pipe structure, includes an upper half 221a and a mating lower half 222a. The light shield 22a can be preferably made of opaque materials. Each of both ends of the light shield 22a can include a respective mounting element 223a or 223b for installing the respective point light source 21a or 21b. One feature of the present invention is that the lower half 222a of the light shield 22a further includes a long slot 224a lying along the axial longitudinal direction of the light shield 22a. The long slot 224a has a length approximately equal to an ordinary width of a document for whole scale scanning. The interior surface of the light shield 22a can be formed as a diffusion surface 225a for evenly diffusing the lights emitted by the point light sources 21a and 21b inside the light shield 22a, by which localized illumination phenomenon of the point lights 21a and 21b can be prevented. Therefore, under such an arrangement of the present invention, quality line light source can be obtained from the long slot 224a which provides homogeneous line lights from the diffused lights inside the light shield 22a, though the point light sources 21a and 21b are applied.

Referring now again back to FIG. 3, just like the first embodiment in previous description, the inner wall of the light shield 22a and the diffusion surface 225 includes a plurality of the ring protrusions 226 and the high reflection layer. Methods for forming the high reflection layer (not shown in the figure) can be any injection method or any electroplating. In the optics theory, the ring protrusions 226 can have an excellent diffusion ability. Therefore, the lights emitted by the point light sources 21a and 21b can be evenly diffused inside the light shield 22a, and then a homogeneous line light source can be constructed through the long slot 224a.

Nevertheless, illustration adjacent to the point light sources 21a and 21b are still higher than that in the middle of the light shield 22a. To overcome such localized illumination problem of the light source mechanism 2a, the diffusion ability of the ring protrusions 226 adjacent to the point light sources 21a and 21b can be reduced and, on the other hand, that of the ring protrusions 226 in the middle of the light shield 22a can be increased. Under such an arrangement, the illumination adjacent to the point light sources 21a and 21b will be decreased a little bit due to the decrease in the diffusion ability of the ring protrusions 226 therearound. On the other hand, the illumination of the middle portion of the light shield 22a will be increased slightly due to the increase in the diffusion ability of the ring protrusions 226 therearound. By proper adjustment upon the diffusion ability of the ring protrusions 226, the line light quality from the long slot 224a of the light shield 22a can be improved further, and so as the scanning quality.

While the present invention has been particularly shown and described with reference to a preferred embodiment, it will be understood by those skilled in the art that various changes in form and detail may be without departing from the spirit and scope of the present invention.

I claim:

1. [A light source mechanism for an imaging] *An* apparatus, comprising:

at least a point light source[, for providing illumination to the imaging apparatus] *configured to provide light* during a scanning process; and a light shield [including] *comprising* a hollow pipe structure *with an axis* and having a mounting element at one end for installing the point light source[;], wherein the light shield further [includes] *comprises* a [long] slot lying along an axial [longitudinal] direction, [thereof for allowing lights to leave] *wherein the slot is configured to receive the light therethrough, such that the light exits* the light shield *via the slot*,

*wherein* an inner surface of the light shield [being] *comprises* a [diffusion] *diffuse* surface for diffusing [lights inside the light shield, and wherein a line light source is formed at the long slot of the light shield] *the light from the point light source*, wherein [said] *the* diffusion surface of [said] *the* light shield [includes a plurality of] *comprises* ring protrusions *located adjacent the point light source and ring protrusions located distant from the point light source,*

*wherein the ring protrusions located adjacent the point light source are configured to provide a reduced diffusion of the light as compared to the ring protrusions located distant from the point light source, and*

*wherein a line light source is formed at the slot of the light shield.*

2. The [light source mechanism for an imaging] apparatus [according to] *of* claim 1[includes], *further comprising* two [said] point light sources mounted at respective ends of [said] *the* light shield.

3. The [light source mechanism for an imaging] apparatus [according to] *of* claim 1, wherein [said] *the* ring protrusions are formed by electroplating.

4. The [light source mechanism for an imaging] apparatus [according to] *of* claim 1, wherein [said] *the* ring protrusions are formed by injection.

5. [A light source mechanism for an imaging] *An* apparatus, comprising:

at least a point light source[, for providing illumination to the imaging apparatus] *configured to provide light* during a scanning process; and a light shield including a hollow pipe structure *with an axis* and having a mounting element at one end for installing the point light source[;], wherein the light shield further [includes a long] *comprises a* slot lying along [an] *the* axial longitudinal direction [thereof for allowing lights to leave] *through which the light is configured to exit* the light shield,

*wherein* an inner surface of the light shield [being] *comprises* a [diffusion] *diffuse* surface for diffusing [lights inside the light shield, and wherein a line light source is formed at the long slot of the light shield, and] *the light from the point light source along at least a portion of the axis of the light shield,* wherein [said] *the* light shield includes an upper half and a mating lower half, the upper half [having said diffusion] *comprising the diffuse* surface, and the lower half [including said long] *comprising the* slot and an interior high reflection layer*, and*

*wherein a first portion of the diffuse surface located nearest the point light source has a reduced ability to diffuse the light as compared to a second portion of the diffuse surface located furthest from the point light source.*

6. The [light source mechanism for an imaging] apparatus [according to] *of* claim 1, wherein [said] *the* point light source [is an LED] *comprises a light emitting diode* (*LED*).

7. The [light source mechanism for an imaging] apparatus [according to] *of* claim 1, wherein [said long] *the* slot has a length substantially equal to a width of [an ordinary] *a* document[for experiencing said scanning process] *being scanned.*

8. A light source mechanism for an imaging apparatus, comprising:

at least a point light source, for providing [illumination] *light* to the imaging apparatus during a scanning process; and a light shield including a hollow pipe structure *with an axis* and having a mounting element at one end for installing the point light source[;], wherein the light shield further [includes] *comprises* a [long] slot lying along an axial [longitudinal] direction[thereof for allowing lights to leave], *wherein the slot is configured to receive the light therethrough, such that the light exits* the light shield *via the light slot,*

*wherein* an inner surface of the light shield [being] *comprises* a [diffusion] *diffuse* surface for diffusing [lights inside the light shield, and wherein a line light source is formed at the long slot of the light shield] *the light from the point light source, thereby homogenizing the light intensity within the light shield along at least a portion of the axis of the light shield*, and wherein a diffusion ability of said [diffusion] *diffuse* surface of said light shield increases with an increase in the distance from said point light source.

*9. An apparatus, comprising:*

*a light source configured to provide light for a scanning process; and*

*a light shield comprising a substantially hollow tube structure having two ends and a cavity formed therein, wherein the light shield has an inner surface that inwardly reflects the light of the light source that enters the cavity from at least one end, wherein the inner surface of the light shield includes a diffuse area that diffuses the reflected light along at least a portion of an axis of the hollow tube structure, wherein the diffuse area comprises a plurality of ring protrusions located adjacent the light source and a plurality of ring protrusions located in the middle of the light shield, and wherein a diffusion ability of the plurality of ring protrusions located in the middle of the light shield is greater than a diffusion ability of the plurality of ring protrusions located adjacent the light source.*

*10. An apparatus, comprising,*

*means for providing light for a scanning process;*

*means for reflecting the light within a cavity of a hollow tube; and*

*means for diffusing the light within the cavity of the hollow tube, wherein the means for diffusing light homogenizes a light intensity within the cavity along at least a portion of an axis of the hollow tube and comprises a plurality of ring protrusions on at least a portion of an inner surface of the hollow tube, and wherein a diffusion ability of the plurality of ring protrusions increases with an increase in distance of the plurality of ring protrusions from the means for diffusing light.*

*11. The apparatus of claim 9, wherein the ring protrusions comprise alternating concave and convex surfaces on the inner surface of the hollow tube, and run in a direction transverse to the axis of the hollow tube.*

*12. The apparatus of claim 9, wherein the light shield comprises an upper portion and a lower portion, and a slot configured to allow the light to exit the hollow tube structure.*

*13. The apparatus of claim 9, wherein the inner surface of the light shield includes an area having a high reflection layer.*

*14. The apparatus of claim 9, wherein the plurality of ring protrusions are substantially parallel with each other, and wherein the ring protrusions are substantially perpendicular to the axis of the hollow tube.*

*15. The apparatus of claim 9, wherein the light source comprises two light sources mounted at respective ends of the light shield.*

*16. The apparatus of claim 9, wherein the light source is an LED.*

*17. The apparatus of claim 12, wherein the upper portion includes a diffuse surface, and wherein the lower portion includes an interior high reflection layer and the slot.*

*18. The apparatus of claim 10, wherein the means for providing light comprises two light sources mounted at respective ends of the means for diffusing light.*

*19. The apparatus of claim 10, wherein the means for providing light comprises an LED.*

*20. The apparatus of claim 13, wherein the diffuse area and the area having the high reflection layer are formed through an injection or an electroplating process.*

*21. The apparatus of claim 5, wherein the first portion of the diffuse surface comprises a plurality of ring protrusions located adjacent the point light source, and wherein the second portion of the diffuse surface comprises a plurality of ring protrusions located at a middle portion of the light shield.*

*22. The light source mechanism of claim 8, wherein the diffuse surface of the light shield comprises a first portion of ring protrusions located adjacent the point light source and a second portion of ring protrusions located further from the point light source, wherein the first portion of ring protrusions have a first diffusion ability, wherein the second portion of ring protrusions have a second diffusion ability, and wherein the second diffusion ability is greater than the first diffusion ability.*

* * * * *